(12) United States Patent
Akamatsu et al.

(10) Patent No.: US 11,243,546 B2
(45) Date of Patent: Feb. 8, 2022

(54) MOVING BODY MANAGEMENT SYSTEM, MOVING BODY, TRAVELING MANAGEMENT DEVICE, AND COMPUTER PROGRAM

(71) Applicant: NIDEC-SHIMPO CORPORATION, Nagaokakyo (JP)

(72) Inventors: Masahiro Akamatsu, Nagaokakyo (JP); Noriyuki Murai, Kyoto (JP)

(73) Assignee: NIDEC-SHIMPO CORPORATION, Nagaokakyo (JP)

( * ) Notice: Subject to any disclaimer, the term of this patent is extended or adjusted under 35 U.S.C. 154(b) by 38 days.

(21) Appl. No.: 16/498,405

(22) PCT Filed: Mar. 1, 2018

(86) PCT No.: PCT/JP2018/007786
§ 371 (c)(1),
(2) Date: Sep. 27, 2019

(87) PCT Pub. No.: WO2018/180174
PCT Pub. Date: Oct. 4, 2018

(65) Prior Publication Data
US 2020/0264631 A1     Aug. 20, 2020

(30) Foreign Application Priority Data

Mar. 27, 2017   (JP) .............................. JP2017-061669

(51) Int. Cl.
*G05D 1/02*       (2020.01)
(52) U.S. Cl.
CPC ........... *G05D 1/0282* (2013.01); *G05D 1/024* (2013.01)

(58) Field of Classification Search
CPC ............................. G05D 1/0282; G05D 1/024
See application file for complete search history.

(56) References Cited

U.S. PATENT DOCUMENTS 5,612,881 A * 3/1997 Moroto ............. G01C 21/3626
                                                  340/990
6,092,010 A * 7/2000 Alofs ................... G05D 1/0274
                                                    701/23
(Continued)

FOREIGN PATENT DOCUMENTS

JP       2003140747 A      5/2003
JP       2008257522 A     10/2008

*Primary Examiner* — Nicholas Kiswanto
(74) *Attorney, Agent, or Firm* — Viering, Jentschura & Partner mbB

(57) ABSTRACT

A management system manages travel of at least one vehicle, and includes a vehicle and a travel management apparatus. The vehicle includes motors, a drive unit to move the vehicle by controlling the motors, a first communication circuit, and a control circuit. The travel management apparatus includes a signal processing circuit to generate an $n^{th}$ command for causing the vehicle to move from an n (n: a positive integer)$^{th}$ location to an $(n+1)^{th}$ location and a second communication circuit. When the vehicle arrives in a region defined for the $(n+1)^{th}$ location while moving from the $n^{th}$ location toward the $(n+1)^{th}$ location, the vehicle transmits a notification of arrival-in-region to the travel management apparatus. Upon receiving the notification of arrival-in-region, the travel management apparatus generates an $(n+1)^{th}$ command for causing the vehicle to move from the $(n+1)^{th}$ location to an $(n+2)^{th}$ location, and transmits it to the vehicle.

10 Claims, 12 Drawing Sheets

(56) References Cited

U.S. PATENT DOCUMENTS

| | | | |
|---|---|---|---|
| 8,135,496 B2 | 3/2012 | Hayashi | |
| 8,473,116 B2 | 6/2013 | Hori et al. | |
| 8,886,452 B2 * | 11/2014 | Takahashi | G01C 21/00 |
| | | | 701/411 |
| 8,897,917 B2 * | 11/2014 | Tanaka | G05D 1/0088 |
| | | | 700/253 |
| 9,212,917 B2 * | 12/2015 | Lin | G08G 1/123 |
| 10,831,195 B2 * | 11/2020 | Ito | G05D 1/0297 |
| 10,866,587 B2 * | 12/2020 | Akamatsu | G05D 1/0022 |
| 2011/0050461 A1 * | 3/2011 | Pixley | G08G 1/056 |
| | | | 340/933 |

* cited by examiner

MOVING BODY MANAGEMENT SYSTEM, MOVING BODY, TRAVELING MANAGEMENT DEVICE, AND COMPUTER PROGRAM

RELATED APPLICATION(S)

This application is a national stage entry according to 35 U.S.C. § 371 of PCT Application No. PCT/JP2018/007786 filed on Mar. 1, 2018, which claims priority from Japanese Application No. 2017-061669, filed on Mar. 27, 2017, each of which is incorporated herein by reference in its entirety.

TECHNICAL FIELD

The present disclosure relates to a management system for vehicles, a vehicle, a travel management apparatus, and a computer program.

BACKGROUND

Japanese Laid-Open Patent Publication No. 2008-257522 discloses a technique for operating a ground controller, such as crossing barriers, that are provided on a road which is traveled by an automated guided car. In this publication, when the automated guided car passes at two transmission points before the crossing barriers that are provided on the road, a first sequencer gives an instruction to close the crossing barriers. The "two transmission points before the crossing barriers" defines a location from which "+α seconds" will be needed until the automated guided car arrives at the crossing barriers.

However, the "+α seconds" will vary if the automated guided car slows down. Therefore, the first sequencer sleeps until a seconds have elapsed since detecting that the automated guided car passed through a certain predefined location, and thereafter gives an instruction for the ground controller, e.g., crossing barriers, to undergo a closing operation.

CITATION LIST

Patent Literature

[Patent Document 1] Japanese Laid-Open Patent Publication No. 2008-257522

SUMMARY

The technique in the Patent Document as aforementioned adjusts the timing with which to operate a ground controller, e.g., crossing barriers, in accordance with the current operation of the automated guided car, but does not control the travel of the automated guided car itself.

An embodiment of the present disclosure provides a technique of appropriately controlling the travel of an automated guided car while accounting for the operation of the automated guided car.

In at least one exemplary embodiment, the management system is a management system which manages travel of at least one vehicle, the management system comprising: the vehicle; and a travel management apparatus to manage travel of the vehicle, the vehicle including a motor, a drive unit to move the vehicle by controlling the motor, a first communication circuit to communicate with the travel management apparatus, and a control circuit to control the drive unit and the first communication circuit, the travel management apparatus including a signal processing circuit to generate an $n^{th}$ command for causing the vehicle to move from an n (n: a positive integer)$^{th}$ location to an $(n+1)^{th}$ location, and a second communication circuit to transmit the $n^{th}$ command to the vehicle, wherein, when the vehicle arrives in a region defined for the $(n+1)^{th}$ location while the vehicle moves from the $n^{th}$ location toward the $(n+1)^{th}$ location in accordance with the $n^{th}$ command, the control circuit transmits a notification of arrival-in-region to the travel management apparatus via the first communication circuit; and upon receiving the notification of arrival-in-region via the second communication circuit, the signal processing circuit of the travel management apparatus generates an $(n+1)^{th}$ command for causing the vehicle to move $(n+1)^{th}$ location to an $(n+2)^{th}$ location, and transmits the $(n+1)^{th}$ command to the vehicle via the second communication circuit.

With a management system according to an illustrative embodiment of the present disclosure, when a vehicle arrives in a region defined for an $(n+1)^{th}$ location while moving from an n (n: a positive integer)$^{th}$ location to the $(n+1)^{th}$ location, the vehicle transmits a notification of arrival-in-region to a travel management apparatus. Upon receiving the notification of arrival-in-region, a signal processing circuit in the travel management apparatus generates a command for causing the vehicle to further move to a next $(n+2)^{th}$ location, and transmits it to the vehicle. Before arriving at the $(n+1)^{th}$ location, the vehicle is able to begin a process for traveling from the $(n+1)^{th}$ location to the $(n+2)^{th}$ location. Since the process can be finished more quickly than if the process is performed after arriving at the $(n+1)^{th}$ location, a more smooth travel is made possible.

BRIEF DESCRIPTION OF DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Hereinafter, with reference to the attached drawings, an exemplary management system according to the present disclosure, including a vehicle(s) and a travel management apparatus, will be described. In the present specification, automated guided vehicles will be illustrated as exemplary vehicles. An automated guided vehicle, also called AGVs, will be denoted as "AGVs" in the present specification.

Figure 1:
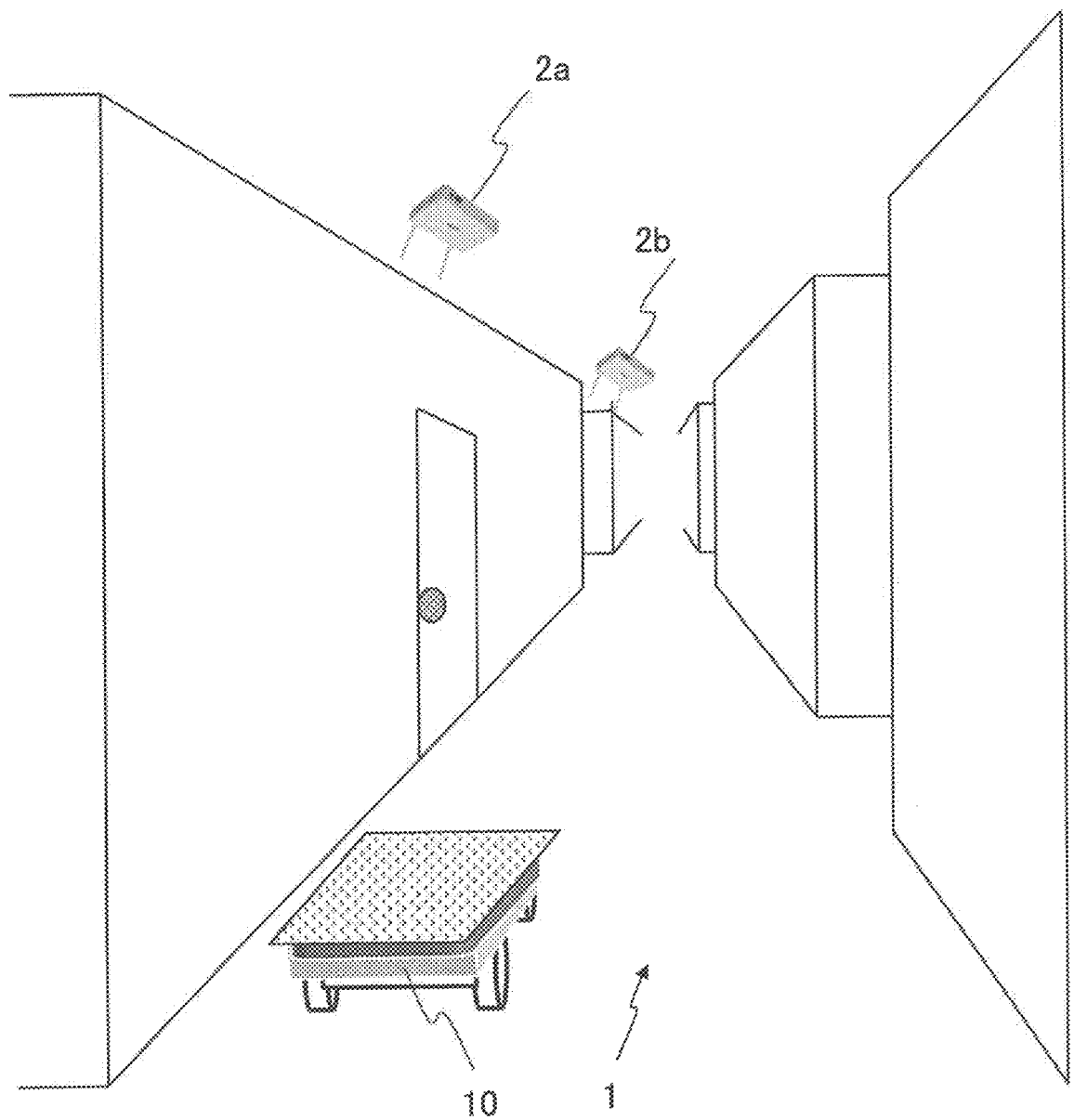
FIG. 1 is a diagram showing an example of an AGV 10 traveling through a passageway 1 within a factory.
Figure 2:
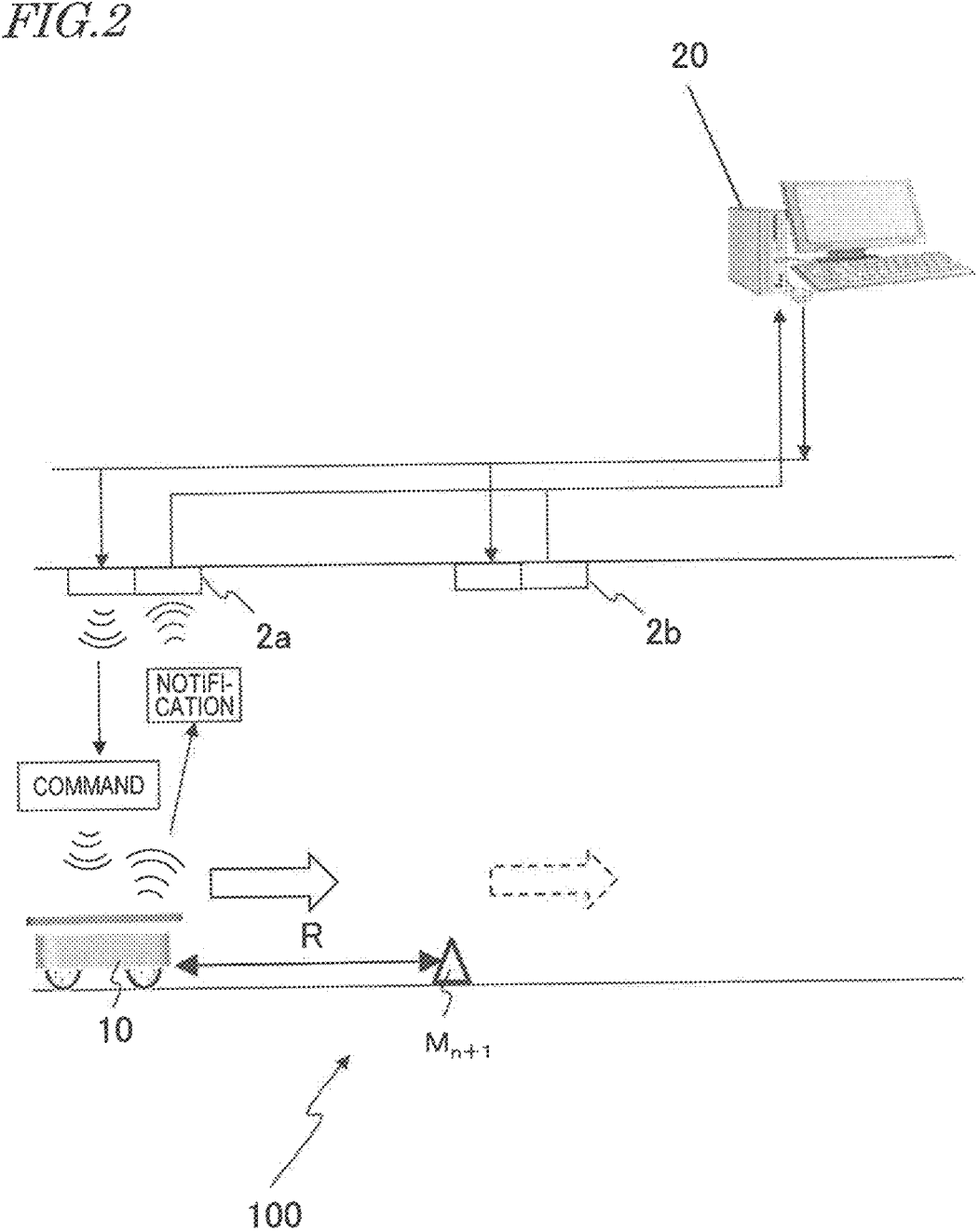
FIG. 2 is a diagram showing in outline a management system 100 which manages travel of the AGV 10.

FIG. 1 shows an AGV 10 traveling through a passageway 1 within a factory, for example. FIG. 2 a diagram showing in outline a management system 100 according to this example, which manages travel of the AGV 10. In the illustrated example, the AGV 10 retains map data, and travels while recognizing the location at which it is currently traveling. The traveling path of the AGV 10 conforms to commands from a travel management apparatus 20. According to commands, the AGV 10 drives its internal motors, and moves by rotating the wheels. The commands are wirelessly sent from the travel management apparatus 20 to the AGV 10. The communication between the AGV 10 and the travel management apparatus 20 is performed by way of wireless access points 2a, 2b, etc., that are provided near the ceiling of the factory. Communications may comply with the Wi-Fi (registered trademark) standards, for example. Although FIG. 1 illustrates only one AGV 10, a plurality of AGVs 10 may be traveling. The travel of each of such a plurality of AGVs 10 may or may not be managed by the travel management apparatus 20.

In outline, the operations of the AGV 10 and the travel management apparatus 20 included in the management system 100 are as follows. It is assumed that, in accordance with a command from the travel management apparatus 20 ($n^{th}$ command (n: a positive integer), the AGV 10 is moving from an $n^{th}$ location to an $(n+1)^{th}$ location (hereinafter denoted as a "location $M_{n+1}$", etc.) which is a target location.

When the AGV 10 arrives in a certain region, it transmits a notification of arrival-in-region (hereinafter referred to as a "notification") to the travel management apparatus 20. The "certain region" is a region that is defined for each location $M_{n+1}$. The notification is sent to the travel management apparatus 20 via a wireless access point 2a. An exemplary method of detection as to whether the AGV 10 has arrived in the certain region or not may be to utilize a sensor that senses surrounding environments of the AGV 10. The AGV 10 may compare the output from the sensor against the map data, estimate a location on the map data that matches the best to be the vehicle's own location, and determine whether the vehicle's own location as estimated fits within the region or not.

Upon receiving the notification, the travel management apparatus 20 generates a next command (($n+1)^{th}$ command) for causing the AGV 10 to move from the location $M_{n+1}$ to a location $M_{n+2}$. The $(n+1)^{th}$ command includes position coordinates of the location $M_{n+2}$, and may further include an acceleration time, a moving velocity for traveling at a constant velocity, or other numerical values. The travel management apparatus 20 transmits the $(n+1)^{th}$ command to the AGV 10.

Upon receiving the $(n+1)^{th}$ command, the AGV 10 analyzes the $(n+1)^{th}$ command to perform a preprocessing computation that is needed to move from the location $M_{n+1}$ to the location $M_{n+2}$. The preprocessing computation may be computations for determining the rotational speed, the rotating time, and the like of each motor for driving each wheel of the AGV 10, for example. By completing the preprocessing computation before arriving at the location $M_{n+1}$, the AGV 10 is able to smoothly begin a move for the next location $M_{n+2}$. In the case where the preprocessing computation is performed, the AGV 10, as externally observed, will appear to be continuously traveling without stopping.

In any system in which an AGV is moved from a certain location to a next target location in accordance with an external instruction and thereafter a further instruction is given to the AGV to move to a next target location, continuous travel of the AGV has not been achieved heretofore. The reason is that the AGV would transmit a notification when arriving at the target location, and then transmit a next command, such that the preprocessing computation would always be performed after arrival at the target location. The AGV 10 could not help but stop at the location $M_{n+1}$ until the computation was finished. The AGV 10 would perform intermittent operations, such that it would stop each time arriving at a next target location, and thereafter beginning to move again.

In the illustrative management system 100 of the present disclosure, at the timing with which the AGV 10 arrives at a location that lies at a distance R from the location $M_{n+1}$, a command that is needed for traveling from the location $M_{n+1}$ is received, and a preprocessing computation is performed. Consequently, after arriving at the location $M_{n+1}$, the AGV 10 is able to continuously operate in accordance with the result of the preprocessing computation, and begin traveling toward the next location $M_{n+2}$. As used herein, to continuously operate means "while at least one motor does not stop rotating". Since the preprocessing computation is performed, it is not necessary to stop all motors of the AGV 10, and at least one is allowed to keep rotating.

Figure 3A:
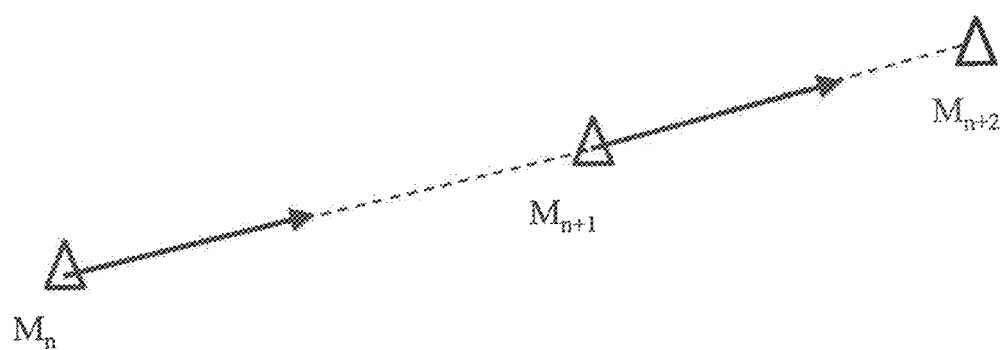
FIG. 3A is a diagram showing a moving path of the AGV 10 when traveling straight.
Figure 3B:
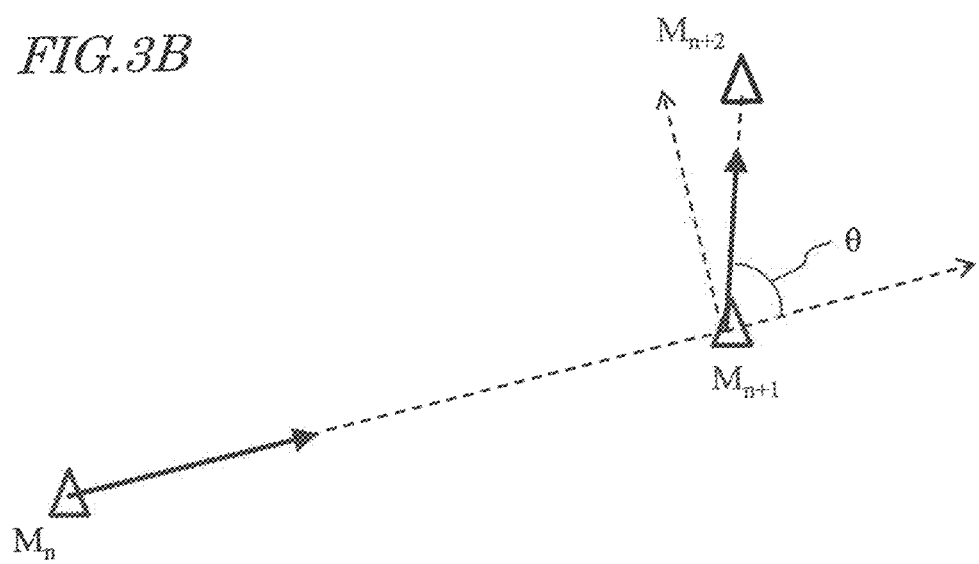
FIG. 3B is a diagram showing a moving path of the AGV 10 turning left at a location $M_{n+1}$ and moving toward a location $M_{n+2}$.
Figure 3C:
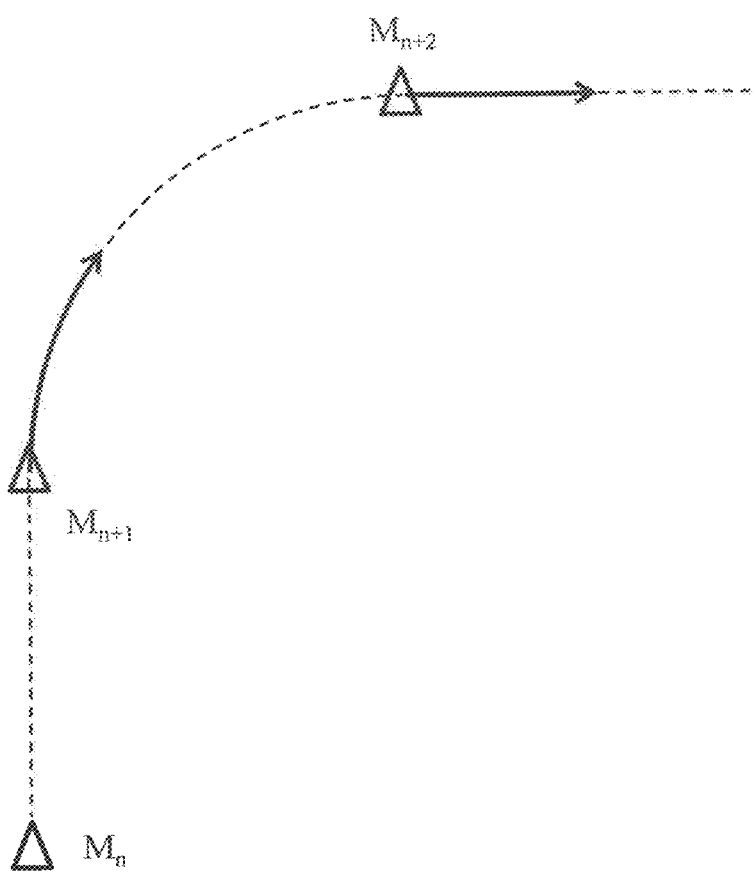
FIG. 3C is a diagram showing a moving path of the AGV 10 when moving in a circular arc shape from a location $M_{n+1}$ to a location $M_{n+2}$.

The AGV 10 is able to move in various directions. FIG. 3A through FIG. 3C show example moving paths of the AGV 10 continuously moving.

FIG. 3A shows a moving path of the AGV 10 when traveling straight. After arriving at a location $M_{n+1}$, the AGV 10 may continuously operate each motor in accordance with the result of the preprocessing computation, thus continuing to linearly move toward a next location $M_{n+2}$.

FIG. 3B shows a moving path of the AGV 10 turning left at a location $M_{n+1}$ and moving toward a location $M_{n+2}$. Although the AGV 10 once stops at the location $M_{n+1}$, at least one motor located on the right side of the moving direction continues to rotate. After turning counterclockwise by an angle θ in that place, the AGV 10 rotates all motors at equal speeds toward the location $M_{n+2}$, thus to travel straight. By performing the preprocessing computation, rotation of at least one motor can be continued when arriving at the location $M_{n+1}$.

FIG. 3C shows a moving path of the AGV 10 when moving in a circular arc shape from a location $M_{n+1}$ to a location $M_{n+2}$. After arriving at the location $M_{n+1}$, the AGV 10 increases the rotational speed of the outer motor over that of the inner motor, in accordance with the result of the preprocessing computation. This allows the AGV 10 to continue moving in a circular arc path toward the next location $M_{n+2}$.

Figure 4:
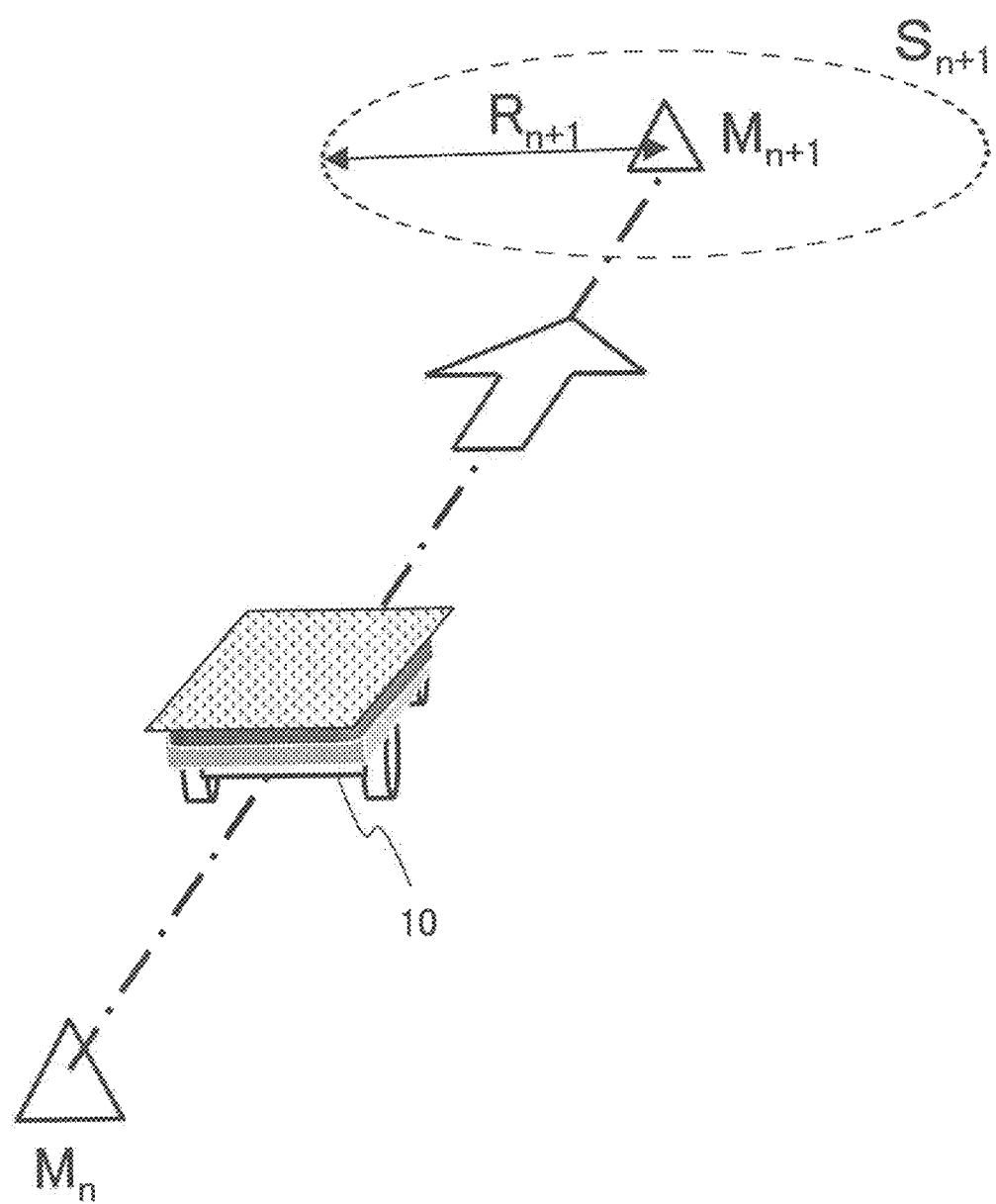
FIG. 4 is a diagram showing an exemplary region $S_{n+1}$ that is centered around a location $M_{n+1}$.

FIG. 4 shows an exemplary region $S_{n+1}$ that is centered around a location $M_{n+1}$. In this example, the region $S_{n+1}$ is a circle with a radius $R_{n+1}$ that is centered around the location $M_{n+1}$. At the timing of arriving at a location that is at a distance $R_{n+1}$ from the target location, the AGV 10 transmits the aforementioned notification to the travel management apparatus 20. An example radius is 50 cm. However, the value of the radius defining the region may not be fixed, but may vary from target location to target location.

Figure 5:
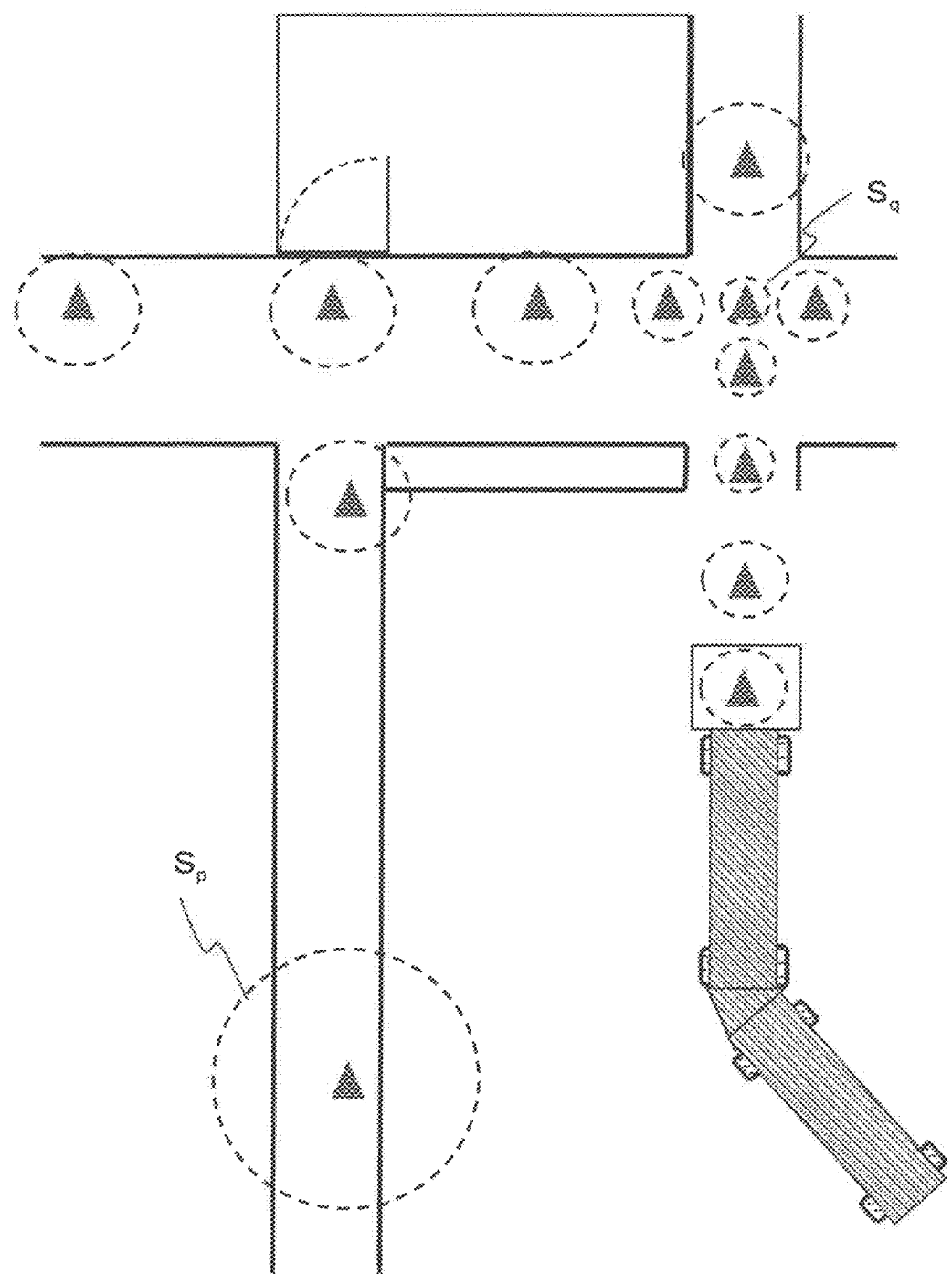
FIG. 5 is a diagram showing respective target locations (A) that are set in the traveling path of the AGV 10 and regions (broken-lined circles) that are set for the respective target locations.

FIG. 5 shows respective target locations (A) that are set in the traveling path of the AGV 10 and regions (broken-lined circles) that are set for the respective target locations. It can be seen that the regions differ in size. As a method of determining the radius R, for example, as in the illustrated region Sp, the radius R may become larger as the interval between two adjacent target locations increases. For example, the region Sp may have a radius of 100 cm. On the other hand, as in the illustrated region Sq, the radius R may become smaller as the interval between two adjacent target locations decreases. For example, the region Sq may have a radius of 25 cm. The command which is transmitted from the travel management apparatus 20 to designate a next target location also includes data of the radius R that defines a region which is determined in accordance with the next target location.

Figure 6:
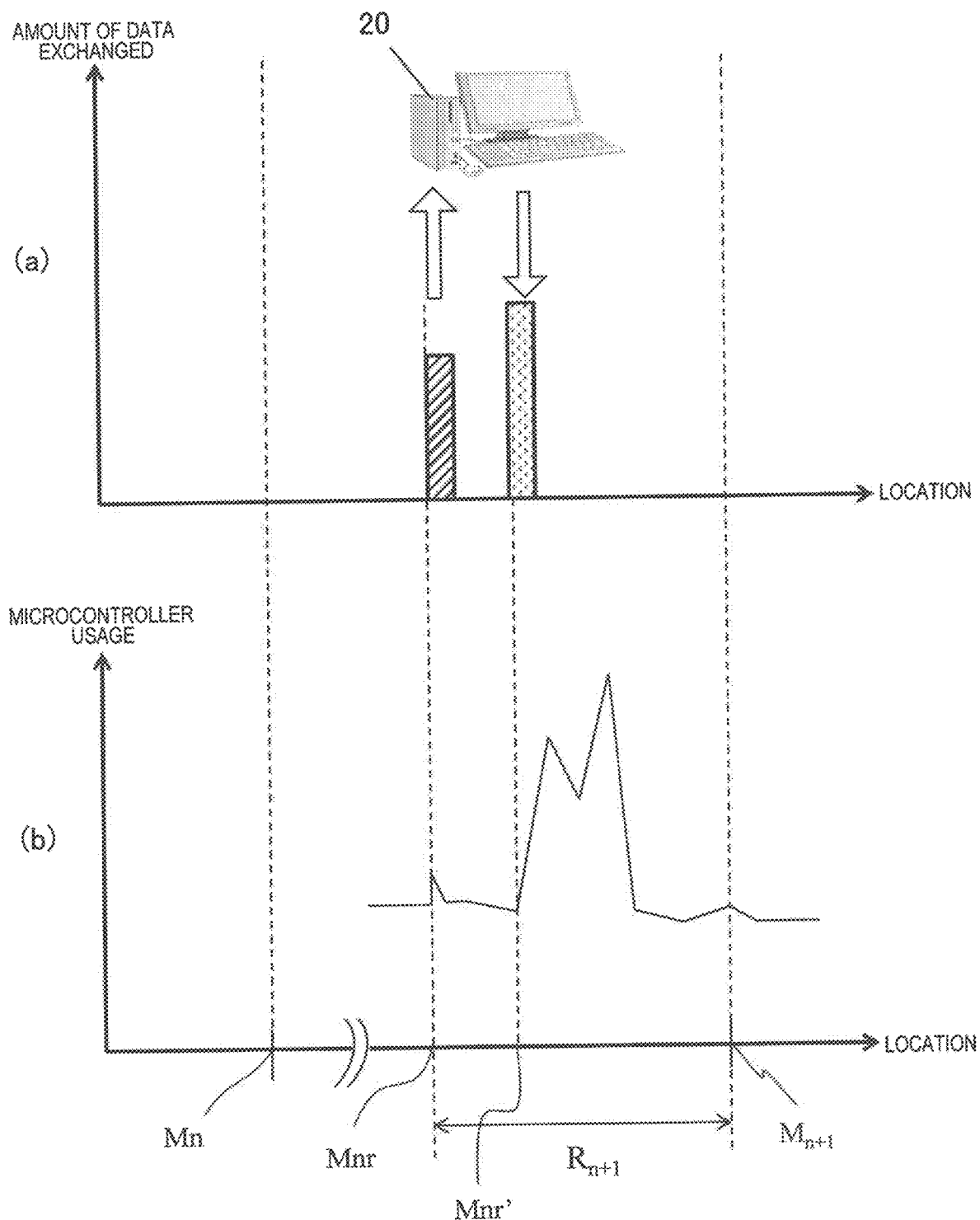
FIG. 6 is a diagram showing computations by the AGV 10 to be performed after the AGV 10 has arrived at an end Mnr of a region that is at a distance $R_{n+1}$ from a target location $M_{n+1}$ and before it arrives at the target location $M_{n+1}$.

FIG. 6 shows computations by the AGV 10 to be performed after the AGV 10 has arrived at an end Mnr of a region that is at a distance $R_{n+1}$ from a target location $M_{n+1}$ and before it arrives at the target location $M_{n+1}$. In FIG. 6, (a) and (b) represent the amount of exchanged data between the AGV 10 and the travel management apparatus 20 as associated with the traveled location, and the computational load (microcontroller usage) of the AGV 10, respectively. As shown in FIG. 6(a), when arriving at the end Mnr of the region, the AGV 10 transmits a notification to the travel management apparatus 20. The AGV 10 continues to travel thereafter, and upon arriving at a location Mnr', receives a command from the travel management apparatus 20, including a designation of a next target location and the like. Then, as shown in FIG. 6(b), a microcontroller (described later) of the AGV 10 analyzes the received command to perform a preprocessing computation that is needed to move from the location $M_{n+1}$ to the location $M_{n+2}$. This increases the microcontroller usage. Thereafter, the preprocessing computation is finished before arrival at the location $M_{n+1}$. As a result, after arriving at the location $M_{n+1}$, a travel toward a next location $M_{n+2}$ can be promptly begun.

Next, with reference to FIG. 7 to FIG. 9, the specific construction of the AGV 10 and the travel management apparatus 20 will be described.

Figure 7:
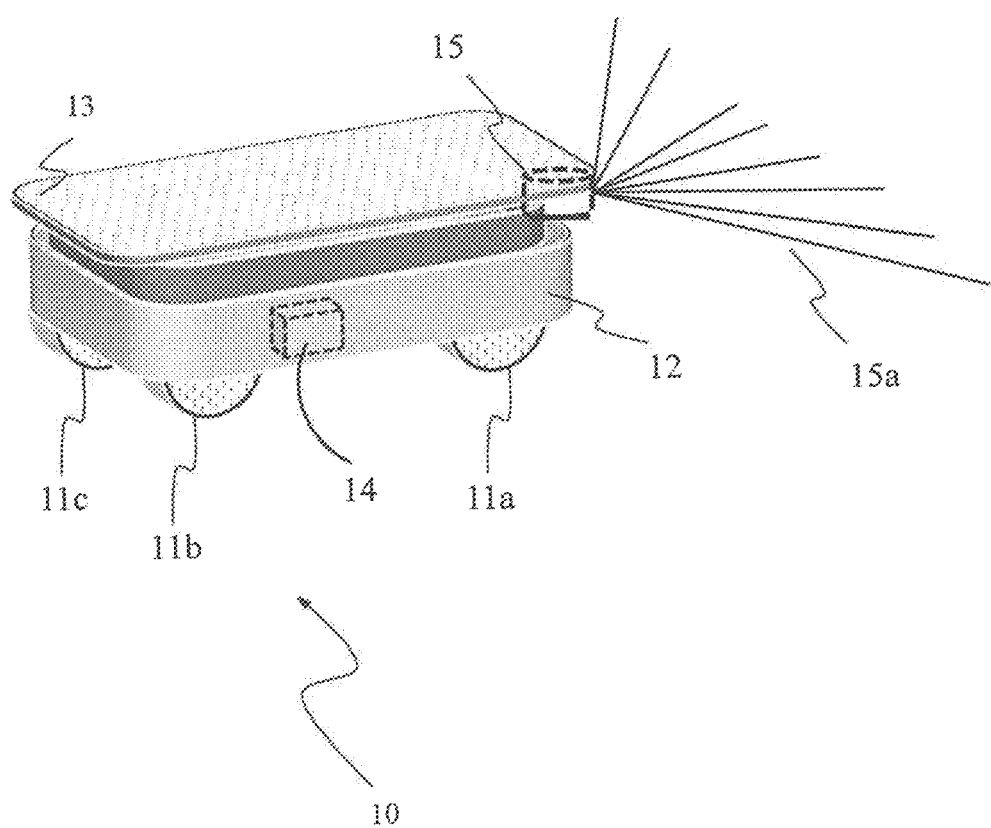
FIG. 7 is an outer view of an illustrative AGV 10 according to an embodiment of the present disclosure.

FIG. 7 is an outer view of an exemplary AGV 10 according to the present embodiment. The AGV 10 includes four wheels 11a through 11d, a frame 12, a carriage table 13, a travel control unit 14, and a laser range finder 15. Although the AGV 10 also includes a plurality of motors, they are not shown in FIG. 7. In FIG. 7, a front wheel 11a, a rear wheel 11b, a rear wheel 11c, or a front wheel 11d are obscured because they are behind the frame 12.

The travel control unit 14 is a device to control operation of the AGV 10, and mainly includes an integrated circuit including a microcontroller (described later), electronic components, and a substrate on which these are mounted. The travel control unit 14 performs data exchanges with the travel management apparatus 20, as well as preprocessing computations, as described above.

The laser range finder 15 is an optical instrument which irradiates a target object with e.g. infrared laser light 15a, and detects reflected light of the laser light 15a to measure a distance to the target object. In the present embodiment, for example, the laser range finder 15 of the AGV emits pulsed laser light 15a in a space ranging 135 degrees to the right and the left (for a total of 270 degrees) of the front of the AGV 10, while altering its direction by every 0.25 degrees, and detects reflected light of the respective laser light 15a. This provides data of distance to the point of reflection in directions determined by a total of 1080 steps of angle in every 0.25 degrees.

From the location and attitude of the AGV 10, and scanning results by the laser range finder 15, deployment of the objects around the AGV is ascertained. Generally speaking, the location and attitude of a vehicle is referred to as a pose. The location and attitude of a vehicle in a two-dimensional plane is expressed by position coordinates (x, y) in an XY orthogonal coordinate system and an angle θ with respect to the X axis. The location and attitude, i.e., pose (x, y, θ), of the AGV 10 may hereinafter be simply referred to as its "location".

The positioning device to be described later compares (matches) local map data which is generated from a scanning result by the laser range finder 15 against environmental map data across a broader range, thus making it possible to identify the AGV's own location (x, y, θ) on the environmental map.

Note that the location of a point of reflection as viewed from the location at which the laser light 15a is emitted may be expressed by using polar coordinates that are defined in terms of angle and distance. In the present embodiment, the laser range finder 15 outputs sensor data that is expressed in polar coordinates. However, the laser range finder 15 may convert a location that is expressed in polar coordinates into orthogonal coordinates for output.

The structure and operation principles of a laser range finder are known, and any more detailed description thereof will be omitted in the present specification. Examples of objects that are detectable by the laser range finder 15 include humans, luggage, shelves, and walls.

The laser range finder 15 is an example of an external sensor that senses a surrounding space to acquire sensor data. Other examples of such external sensors may be image sensors and ultrasonic sensors.

The travel control unit 14 compares the result of measurement by the laser range finder 15 against the map data that is retained in itself, thereby being able to estimate its own current location. The map data may be acquired by the AGV 10 itself, by using an SLAM (Simultaneous Localization and Mapping) technique.

Figure 8:
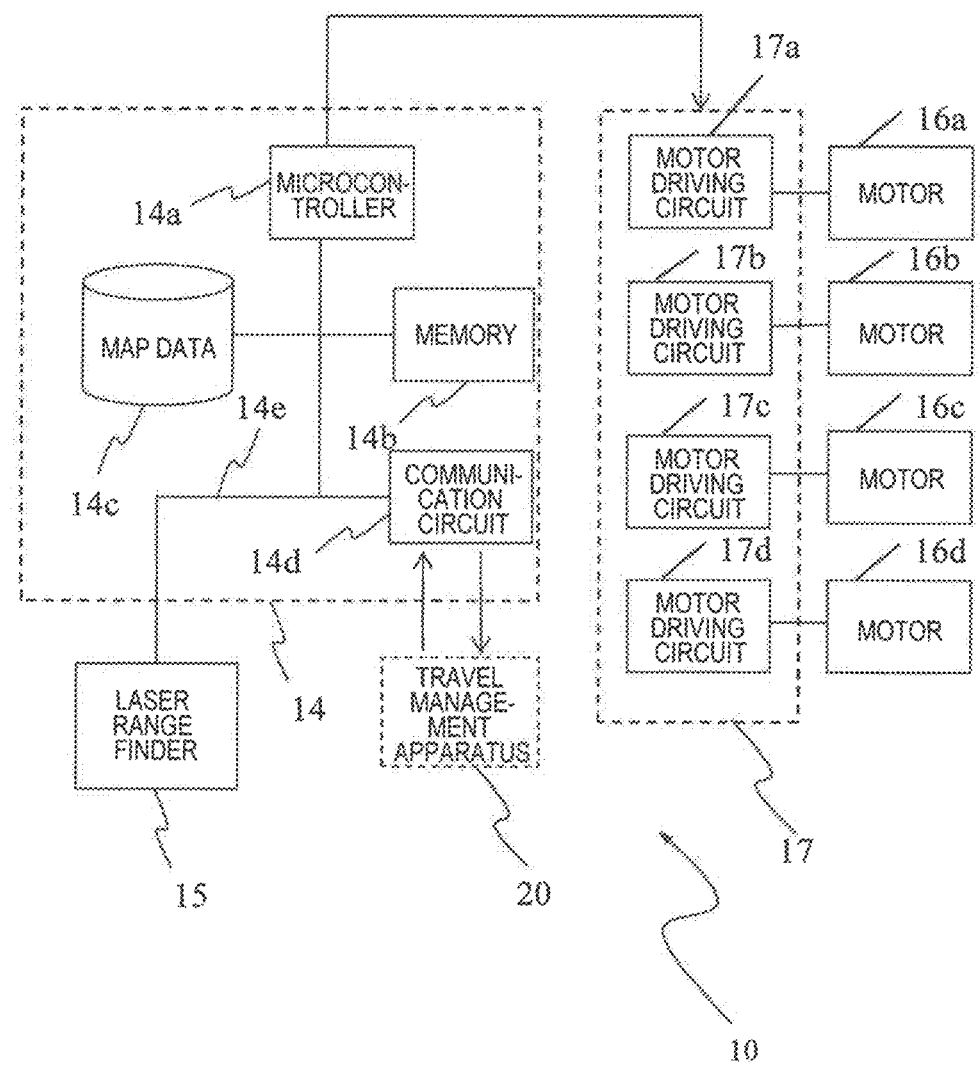
FIG. 8 is a diagram showing the hardware construction of the AGV 110.

FIG. 8 shows a hardware construction of the AGV 110. FIG. 8 also shows a specific construction of the travel control unit 14.

The AGV 10 includes the travel control unit 14, the laser range finder 15, four motors 16a through 16d, and a drive unit 17.

The travel control unit 14 includes a microcontroller 14a, a memory 14b, a storage device 14c, and a communication circuit 14d. The microcontroller 14a, the memory 14b, the storage device 14c, and the communication circuit 14d are connected via a communication bus 14e, so as to be capable of exchanging data with one another. The laser range finder 15 is also connected to the communication bus 14e via a communication interface (not shown), and transmits measurement data as results of measurement to the microcontroller 14a and/or the memory 14b.

The microcontroller 14a is a control circuit (computer) that performs computation for controlling the entire AGV 10, including the travel control unit 14. Typically, the microcontroller 14a is a semiconductor integrated circuit. The microcontroller 14a transmits a PWM (Pulse Width Modulation) signal to the drive unit 17 to control the drive unit 17 so that the electric currents to flow in the motors are adjusted. As a result of this, each of the motors 16a through 16d rotates at a desired rotational speed. Moreover, the microcontroller 14a is able to convert sensor data is output from the laser range finder 15, which is expressed in polar coordinates, into orthogonal coordinates.

The memory 14b is a volatile storage device which stores a computer program to be executed by the microcontroller 14a. The memory 14b may also be utilized as a work memory with which the microcontroller 14a may perform computations. The storage device 14c is a non-volatile semiconductor memory, for example, which stores map data representing the locations of walls, pillars, or other obstacles, as well as passageways, in an environment in which AGV 10 travels (the inside of a factory, etc.). The communication circuit 14d is a wireless communication circuit which performs wireless communications in a manner compliant with the Wi-Fi (registered trademark) standards, for example.

The four motors 16a through 16d are respectively attached to the four wheels 11a through 11d in order to rotate the respective wheels. The number of motors is only an example; there may be two or three, or five or more.

The drive unit 17 includes motor driving circuits 17a through 17d for adjusting respective electric currents to flow in the four motors 16a through 16d. Each of the motor driving circuits 17a through 17d is a so-called inverter circuit which, in accordance with a PWM signal that is transmitted from the microcontroller 14a, turns ON or OFF a current to flow in each motor, thus to adjust the electric current flowing in the motor.

Figure 9:
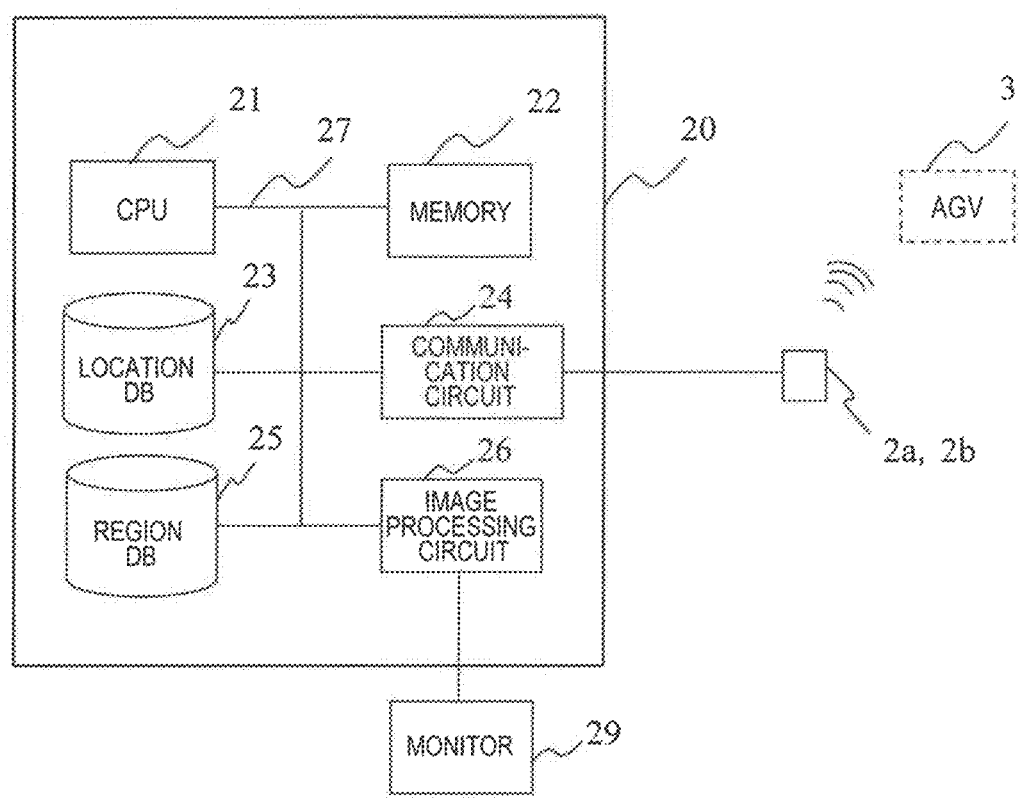
FIG. 9 is a diagram showing a hardware construction of a travel management apparatus 20.

FIG. 9 shows a hardware construction of the travel management apparatus 20. The travel management apparatus 20 includes a CPU 21, a memory 22, a location database (location DB) 23, a communication circuit 24, a region database (region DB) 25, and an image processing circuit 26. The CPU 21, the memory 22, the location DB 23, the communication circuit 24, the region DB 25, and the image processing circuit 26 are connected by a communication bus 27, so as to be capable of exchanging data with one another.

The CPU 21 is a signal processing circuit (computer) which controls operation of the travel management apparatus 20. Typically, the CPU 21 is a semiconductor integrated circuit.

The memory 22 is a volatile storage device which stores a computer program to be executed by the CPU 21. The memory 22 may also be utilized as a work memory with which the CPU 21 may perform computations.

The location DB 23 stores location data representing each location that may become a destination for the AGV 10. The location data may be expressed by coordinates that are virtually set within the factory by an administer, for example. The location data is to be determined by the administer.

The communication circuit 24 performs wired communications in a manner compliant with the Ethernet (registered trademark) standards, for example. The communication circuit 24 is wiredly connected to the wireless access points 2a, 2b, etc., so as to be capable of communicating with the AGV 10 via the wireless access points 2a, 2b, etc. Via the bus 27, the communication circuit 24 receives data to be transmitted to the AGV 10 from the CPU 21. The communication circuit 24 transmits data (notification) received from the AGV 10 to the CPU 21 and/or the memory 22, via the bus 27.

For each location stored in the location DB 23, the region DB 25 stores data representing the size of the region. In the present specification, as the radius data, the region DB 25 stores the magnitude of the radius of a circle that is centered around each location. The radius data is also to be determined by the administer.

The location DB 23 and the region DB 25 may be established on a non-volatile semiconductor memory, or established on a magnetic storage medium such as a hard disk or an optical storage medium such as an optical disc.

The image processing circuit 26 is a circuit which generates video data to be displayed on the external monitor 30. The image processing circuit 26 is mainly operates when the administer manipulates the travel management apparatus 20. Any more detailed description will be omitted in the present embodiment. Note that the monitor 29 may be integrated with the travel management apparatus 20. Moreover, processing by the image processing circuit 26 may be carried out by the CPU 21.

Note that the travel management apparatus 20 may further include data defining other requirements for the AGV 10, and a storage device that stores such data. Examples of "other requirements" include, when going from a certain location to a next location, the following of the AGV 10: segments of accelerated travel; velocity when traveling at a constant velocity; segments of decelerated travel; and acceleration. However, an increase in "other requirements" would result in an increased computation amount associated with the preprocessing computation to be performed by the AGV 10. Therefore, when such "other requirements" increase, it is preferable to increase the size of the region that is defined for the immediately previous location, thus to account for the time required for the preprocessing computation. For example, the size of a region may be determined based on a product of multiplication between: the traveling velocity of the AGV 10 at the time of generating a command to be transmitted from the travel management apparatus 20 to the AGV 10; and the time required for the preprocessing computation. Alternatively, it may be determined depending on how other AGVs 10 may be traveling, the timing of door open/close state of elevators (or shutter curtains), which enable the AGV 10 to go back and forth between traveling environments of different elevations, etc.

Even after transmitting region data indicating the region sizes in a command, the CPU 21 of the travel management apparatus 20 may keep updating the region data based on various information, e.g., information indicating emergence of obstacles. Even while the AGV 10 is on its way from a location $M_n$ to a location $M_{n+1}$ based on an $n^{th}$ command, the size of the region that is defined for the location $M_{n+1}$ may be changed, and notified to the AGV 10.

Next, with reference to FIG. 10, an operation of the management system 100 will be described.

Figure 10:
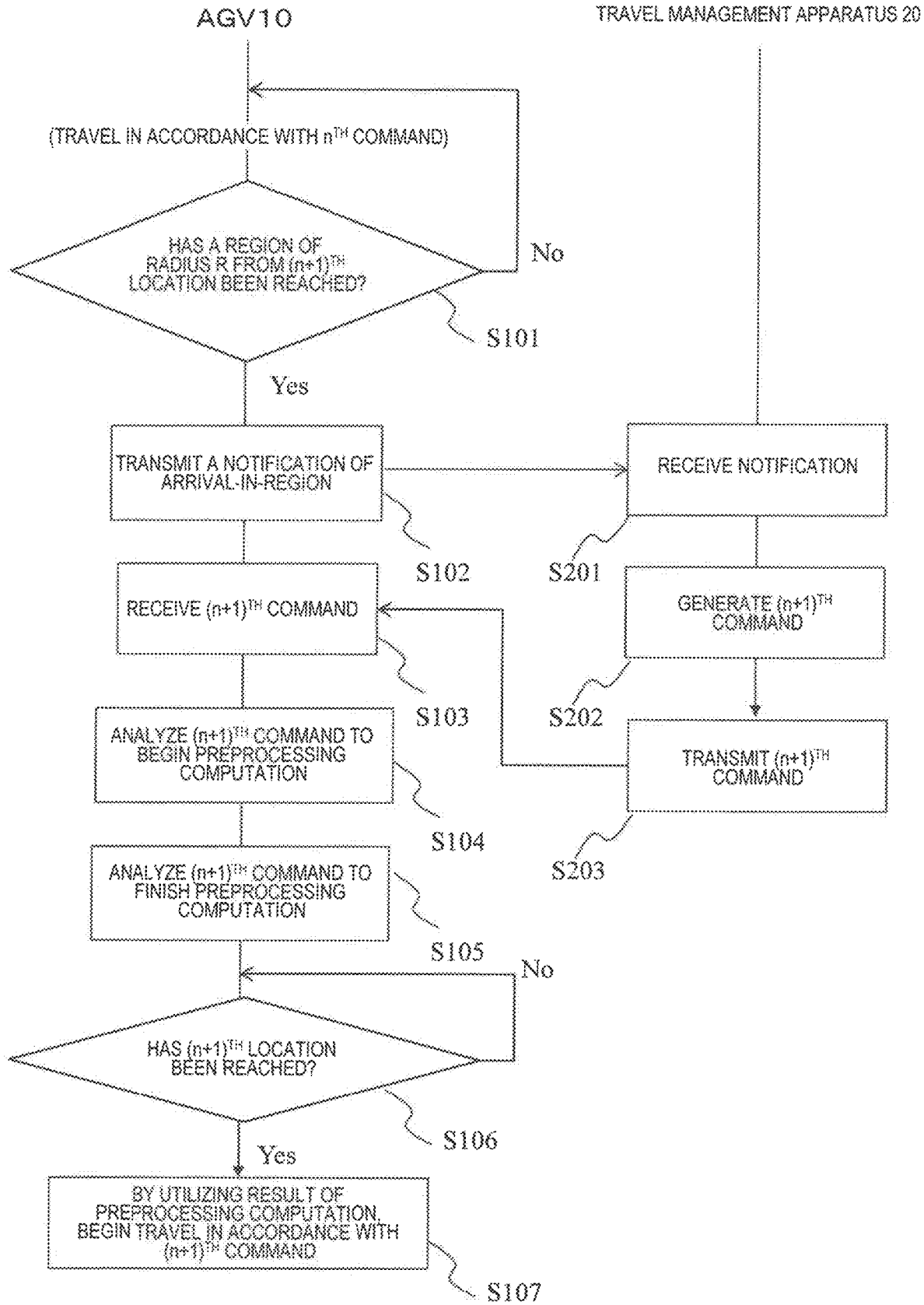
FIG. 10 is a diagram showing communication processes to be performed between the AGV 10 and the travel management apparatus 20.

FIG. 10 shows communication processes to be performed between the AGV 10 and the travel management apparatus 20. In FIG. 10, the left row shows the procedures of processes to be executed by the microcontroller 14a of the AGV 10, while the right row shows the procedures of processes to be executed by the CPU 21 of the travel management apparatus 20. Note that FIG. 10 illustrates an example of processes to be performed while the AGV 10 is traveling in accordance with a certain command ($n^{th}$ command) from the travel management apparatus 20.

At step S101, the microcontroller 14a determines whether a region of the radius R from an $(n+1)^{th}$ location has been reached. More specifically, this is as follows.

The microcontroller 14a causes the laser range finder 15 to scan a range around itself, and acquire measurement data from the laser range finder 15. The microcontroller 14a compares the measurement data acquired from the laser range finder 15 against the map data stored in the storage device 14c, and estimates a location in the map data that has the highest match to be its own current location. The microcontroller 14a determines whether or not the estimated current location is at a distance of the radius R from the $(n+1)^{th}$ location contained in the $n^{th}$ command, determines whether the region of the radius R from the $(n+1)^{th}$ location has been reached, and continues the above process until it is reached.

Once the AGV 10 arrives in the region of the radius R from the $(n+1)^{th}$ location, the process proceeds to step S102.

At step S102, the microcontroller 14a transmits a notification to the travel management apparatus 20. Even after transmission, the AGV 10 continues to travel. Next, the processes by the travel management apparatus 20 will be described.

At step S201, the CPU 21 of the travel management apparatus 20 receives the notification from the AGV 10, via the communication circuit 24.

At step S202, in response to receiving the notification, the CPU 21 generates an $(n+1)^{th}$ command as the next command. For example, the administer may previously determine and input a target location for the AGV to travel to, whereby the CPU 21 will know which location the AGV 10 is supposed to go to next. The CPU 21 refers to the location DB to read the coordinates of the designated location. Moreover, the CPU 21 refers to the region DB 25 to read the value of the radius R of the region that is defined for that location. The CPU 21 compiles these into a single piece of data, and generates the $(n+1)^{th}$ command.

At step S203, the CPU 21 transmits the $(n+1)^{th}$ command to the AGV 10, via the communication circuit 24.

At step S103, the microcontroller 14a of the AGV 10 receives the $(n+1)^{th}$ command from the travel management apparatus 20, via the communication circuit 14d.

At step S104, the microcontroller 14a analyzes the $(n+1)^{th}$ command to begin executing the preprocessing computation. Even at this point, the AGV 10 is still continuing to travel. While the travel is being continued, at step S105, the microcontroller 14a finishes the preprocessing computation. As a result of this, the microcontroller 14a is able to acquire data that is needed for executing the next $(n+1)^{th}$ command, e.g., the rotational speed, the rotating time, and the like of each motor for driving each wheel of the AGV 10.

At step S106, the microcontroller 14a determines whether the $(n+1)^{th}$ location has been reached or not. At this step, too, a process similar to the process described for step S101 is performed, whereby it is determined whether the current location of the AGV 10 and the $(n+1)^{th}$ location match. The microcontroller 14a continues travel until they match; upon a match, the process proceeds to step S107. Note that, even if they do not completely match but there remains a difference, they may be regarded as matching so long as the difference is within a tolerance (e.g. 10 cm).

At step S107, by utilizing the result of the preprocessing computation, the microcontroller 14a begins travel in accordance with the $(n+1)^{th}$ command. If the preprocessing computation were to begin upon arrival at the $(n+1)^{th}$ location, the AGV 10 would need to stop until completion of the preprocessing computation. However, in accordance with the processing of the present embodiment, the preprocessing computation has already been completed upon arrival at the $(n+1)^{th}$ location, and thus a move based on the next $(n+1)^{th}$ command can be smoothly begun.

In the above example, an output result from the laser range finder 15 and map data are compared, and a location on the map data that matches the best is estimated to be the vehicle's own location. However, the vehicle's own location may be estimated by using other methods.

Figure 11:
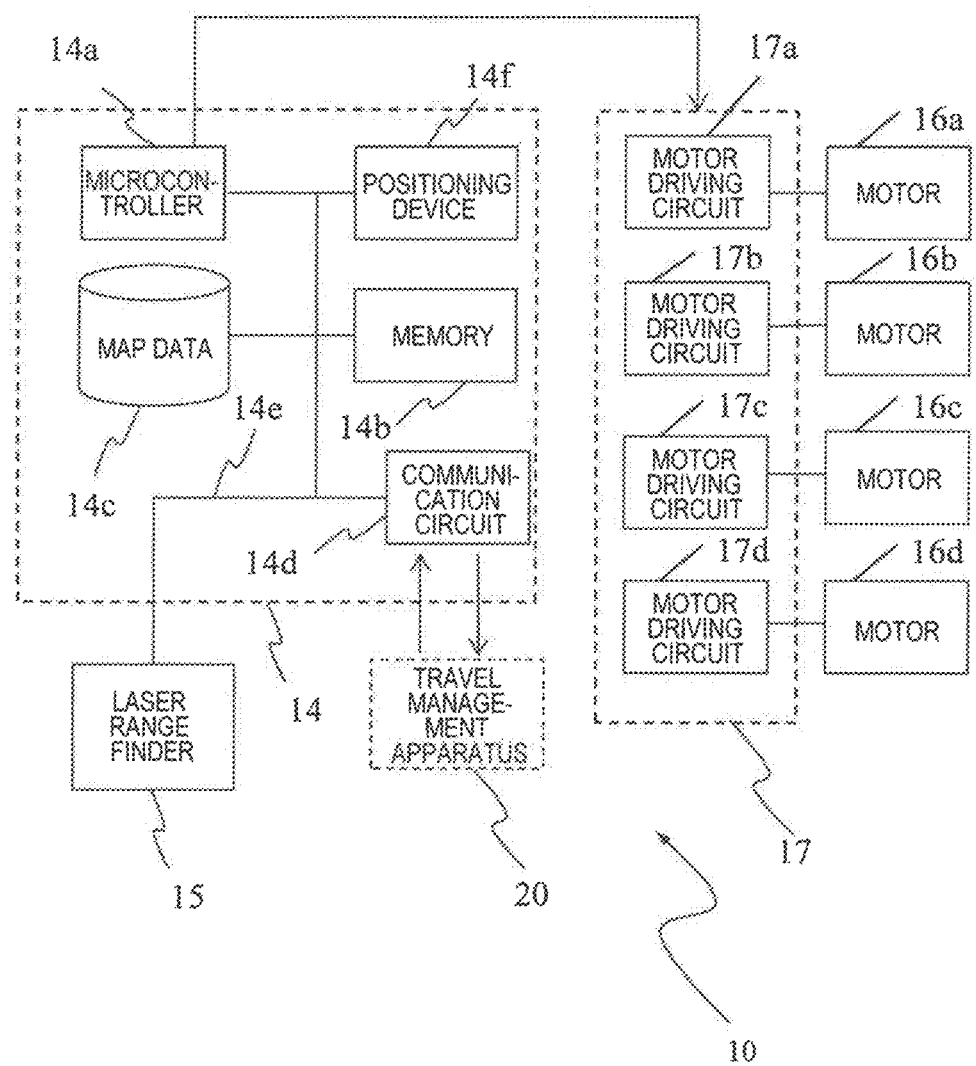
FIG. 11 is a diagram showing a variant of the AGV 10 shown in FIG. 8.

FIG. 11 is a variant of the AGV 10 shown in FIG. 8. The travel control unit 14 has a positioning device 14f. The positioning device 14f includes: an antenna to receive a beacon signal which is provided within an environment that is traveled by the AGV 10; and a signal processing circuit. Different information is to be superposed on the beacon signal depending on the location where it is transmitted. By reading this information, the signal processing circuit is able to estimate its own location. The microcontroller 14a determines which coordinates on the map data stored in the storage device 14c the result of estimating the vehicle's own location corresponds to. If the resultant coordinates have already reached the region, it detects its own arrival in the region.

The aforementioned examples illustrate that the $(n+1)^{th}$ location is reached after finishing the preprocessing computation. However, this is not a requirement. The effects of the present disclosure can be obtained even if the $(n+1)^{th}$ location is reached after the preprocessing computation is begun but before the computation is finished. Since the preprocessing computation is begun before the $(n+1)^{th}$ location is reached, it is evident that the computation will be finished faster than if the preprocessing computation is performed after arrival at the $(n+1)^{th}$ location. As a result of this, the operation to head toward the next target location can be begun more quickly.

The process illustrated in the present specification is more appropriate than determining that arrival at the next target location is likely based on whether or not a predetermined value has been exceeded by a traveling time from a start location of travel in a given segment. The reason is that the time that is needed for traveling from the start location of travel to the target location will vary. If the AGV 10 encounters an obstacle on its way, and avoids it by stopping or detouring, etc., then the traveling time may exceed the predetermined value far before arriving at the next target location. When an unexpected situation has occurred, traveling conditions such as the target location to head for next, velocity, etc., may vary. Any process that assumes arrival on the basis of lapse of time will find it difficult to cope with changing traveling conditions.

With the illustrated management system 100, once arriving in a region that is defined for each target location, the AGV 10 is able to receive a command indicating a next target location from the travel management apparatus 20. By appropriately determining the broadness of the region depending on the expected traveling velocity of the AGV 10, etc., the travel management apparatus 20 is able to transmit a command indicating a next target location when the prospect of substantially arriving at the next target location has become sufficiently high.

Note that, in the process of FIG. 10, a traveling failure, etc., of the AGV 10 may possibly prevent the result of determination at step S101 from becoming "Yes". In such a case, the travel management apparatus 20 will not generate a next $(n+1)^{th}$ command and will not transmit such to the AGV 10, and thus the AGV 10 is not able to head for the next target location. The AGV 10 will stop moving in the segment that is designated by the $n^{th}$ command.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

INDUSTRIAL APPLICABILITY

A management system according to at least one exemplary embodiment of the present disclosure is broadly used for guidance and control of vehicles.

REFERENCE SIGNS LIST

2a, 2b wireless access point, 10 automated guided vehicle (AGV), 14 travel control unit, 14a microcontroller, 14b memory, 14c storage device, 14d communication circuit, 15 laser range finder, 16a-16d motor, 17 drive unit, 17a-17d motor driving circuit, 20 travel management apparatus, 21 CPU, 22 memory, 23 location database (location DB), 24 communication circuit, 25 region database (region DB), 26 image processing circuit, 100 management system

What is claimed is:

1. A management system which manages travel of at least one vehicle,
    the management system comprising:
        the vehicle; and
        a travel management apparatus which manages travel of the vehicle,
    the vehicle including
        a motor,
        a drive unit which moves the vehicle by controlling the motor,
        a first communication circuit which communicates with the travel management apparatus, and
        a control circuit which controls the drive unit and the first communication circuit,
    the travel management apparatus including
        a signal processing circuit which generates an $n^{th}$ command for causing the vehicle to move from an n (n: a positive integer)$^{th}$ location to an $(n+1)^{th}$ location, and
        a second communication circuit which transmits the $n^{th}$ command to the vehicle, wherein,
    when the vehicle arrives in a region defined for the $(n+1)^{th}$ location while the vehicle moves from the $n^{th}$ location toward the $(n+1)^{th}$ location in accordance with the $n^{th}$ command, the control circuit transmits a notification of arrival-in-region to the travel management apparatus via the first communication circuit; and
    upon receiving the notification of arrival-in-region via the second communication circuit, the signal processing circuit of the travel management apparatus generates an $(n+1)^{th}$ command for causing the vehicle to move $(n+1)^{th}$ location to an $(n+2)^{th}$ location, and transmits the $(n+1)^{th}$ command to the vehicle via the second communication circuit,
    wherein the control circuit of the vehicle receives the $(n+1)^{th}$ command via the first communication circuit, and performs a preprocessing computation for causing the vehicle to move to the $(n+2)^{th}$ location,
    wherein the control circuit finishes the preprocessing computation before the vehicle arrives at the $(n+1)^{th}$ location,
    wherein the region has a circular shape with an radius R that is centered around the $(n+1)^{th}$ location, and
    wherein the $n^{th}$ command contains data representing the radius R.

2. The management system of claim 1, wherein, while the vehicle is traveling in accordance with the $n^{th}$ command, the first communication circuit receives updated data of the radius R.

3. The management system of claim 1, wherein the radius R is determined based on a product of multiplication between a traveling velocity of the vehicle as expected when generating the nth command and a time required for the preprocessing computation.

4. The management system of claim 1, wherein, after arriving at the $(n+1)^{th}$ location, the vehicle continuously operates in accordance with a result of the preprocessing computation to begin traveling toward the $(n+2)^{th}$ location.

5. The management system of claim 4, wherein,
    the vehicle further includes
        a positioning device which estimates the vehicle's own location, and
        a storage device storing map data of a space to be traveled; and
    based on a result of estimating the vehicle's own location by the positioning device and on the map data, the control circuit detects that the vehicle has arrived in the region.

6. The management system of claim 4, wherein,
    the vehicle further includes a sensor which acquires space data of an actual environment; and
    the controller utilizes the space data acquired by the sensor to estimate the vehicle's own location.

7. The management system of claim 1, wherein,
    the vehicle further includes
        a positioning device which estimates the vehicle's own location, and
        a storage device storing map data of a space to be traveled; and
    based on a result of estimating the vehicle's own location by the positioning device and on the map data, the control circuit detects that the vehicle has arrived in the region.

8. The management system of claim 1, wherein,
    the vehicle further includes a sensor which acquires space data of an actual environment; and
    the controller utilizes the space data acquired by the sensor to estimate the vehicle's own location.

9. A travel management apparatus for use in a management system which manages travel of at least one vehicle,
    the vehicle including
        a motor,
        a drive unit which moves the vehicle by controlling the motor,
        a first communication circuit which communicates with the travel management apparatus, and
        a control circuit which controls the drive unit and the first communication circuit,
    the travel management apparatus including
        a signal processing circuit which generates an $n^{th}$ command for causing the vehicle to move from an n (n: a positive integer) location to an $(n+1)^{th}$ location, and a second communication circuit which transmits the $n^{th}$ command to the vehicle, wherein, when the vehicle arrives in a region defined for the $(n+1)^{th}$ location while the vehicle moves from the $n^{th}$ location toward the $(n+1)^{th}$ location in accordance with the $n^{th}$ command, the first communication circuit of the vehicle transmits a notification of arrival-in-region;

the second communication circuit receives the notification of arrival-in-region;

the signal processing circuit generates an $(n+1)^{th}$ command for causing the vehicle to move from the $(n+1)^{th}$ location to an $(n+2)^{th}$ location; and the second communication circuit transmits the $(n+1)^{th}$ command to the vehicle, wherein the control circuit of the vehicle receives the $(n+1)^{th}$ command via the first communication circuit, and performs a preprocessing computation for causing the vehicle to move to the $(n+2)^{th}$ location, wherein the control circuit finishes the preprocessing computation before the vehicle arrives at the $(n+1)^{th}$ location, wherein the region has a circular shape with an radius R that is centered around the $(n+1)^{th}$ location, and wherein the $n^{th}$ command contains data representing the radius R.

10. A vehicle whose travel is managed by using a management system that includes a travel management apparatus, the vehicle comprising:

a motor;

a drive unit which moves the vehicle by controlling the motor, a communication circuit which communicates with the travel management apparatus; and a control circuit which controls the drive unit and the communication circuit, wherein, while the vehicle moves in accordance with an $n^{th}$ command received from the travel management apparatus for causing the vehicle to move from an n (n: a positive integer) location to an $(n+1)^{th}$ location, when the vehicle arrives in a region defined for the $(n+1)^{th}$ location, the control circuit transmits a notification of arrival-in-region to the travel management apparatus via the communication circuit; and, after transmitting the notification of arrival-in-region, the communication circuit receives from the travel management apparatus an $(n+1)^{th}$ command for moving from the $(n+1)^{th}$ location to an $(n+2)^{th}$ location, wherein the control circuit of the vehicle receives the $(n+1)^{th}$ command via the first communication circuit, and performs a preprocessing computation for causing the vehicle to move to the $(n+2)^{th}$ location, wherein the control circuit finishes the preprocessing computation before the vehicle arrives at the $(n+1)^{th}$ location, wherein the region has a circular shape with an radius R that is centered around the $(n+1)^{th}$ location, and wherein the $n^{th}$ command contains data representing the radius R.

* * * * *